United States Patent
Imboccioli

(10) Patent No.: US 11,454,994 B2
(45) Date of Patent: Sep. 27, 2022

(54) PRESSURE REDUCING PLANT WITH TWO OR MORE LINES OPERATING IN PARALLEL

(71) Applicant: Pietro Fiorentini S.P.A., Arcugnano (IT)

(72) Inventor: Claudio Imboccioli, Creazzo (IT)

(73) Assignee: Pietro Fiorentini S.P.A., Arcugnano (IT)

( * ) Notice: Subject to any disclaimer, the term of this patent is extended or adjusted under 35 U.S.C. 154(b) by 0 days.

(21) Appl. No.: 17/262,637

(22) PCT Filed: Jul. 29, 2019

(86) PCT No.: PCT/IB2019/056449
§ 371 (c)(1),
(2) Date: Jan. 22, 2021

(87) PCT Pub. No.: WO2020/026116
PCT Pub. Date: Feb. 6, 2020

(65) Prior Publication Data
US 2021/0271271 A1    Sep. 2, 2021

(30) Foreign Application Priority Data

Jul. 30, 2018   (IT) .................. 102018000007629

(51) Int. Cl.
*G05D 16/04*    (2006.01)
*F17D 3/01*    (2006.01)
*G05D 16/06*    (2006.01)

(52) U.S. Cl.
CPC ........... *G05D 16/0404* (2019.01); *F17D 3/01* (2013.01); *G05D 16/0636* (2013.01)

(58) Field of Classification Search
CPC .. G05D 16/0404; G05D 16/0636; F17D 3/01; Y10T 137/777; Y10T 137/7768;
(Continued)

(56) References Cited

U.S. PATENT DOCUMENTS 1,628,859 A  *  5/1927  Shield ................. G05D 16/185
                                        137/489.5
1,726,721 A  *  9/1929  Schullström ........ G05D 16/187
                                        137/492.5
(Continued)

FOREIGN PATENT DOCUMENTS

| IT | 020 100 392 A1 | 11/2011 |
| WO | 2012/153310 | 11/2012 |
| WO | 2015/140706 | 9/2015 |

OTHER PUBLICATIONS

International Search Report and Written Opinion dated Dec. 16, 2019, issued in PCT Application No. PCT/IB2019/056449, filed Jul. 29, 2019.

*Primary Examiner* — Jessica Cahill
(74) *Attorney, Agent, or Firm* — Workman Nydegger

(57) ABSTRACT

A pressure reduction plant including two or more valve assemblies arranged in parallel and including: pressure reducers for fuel gas from the supply pressure to the delivery pressure; pilot valves to transmit a control pressure to the pressure reducers when the delivery pressure reaches the calibration value of the pilot valves; derivation conduits to transmit the delivery pressure to the pressure reducers, the pilot valves and the pressure reducer devices; command lines to transmit the control pressure from the pilot valves to the pressure reducers. One of the pilot valves is configured with a calibration value greater than the calibration value of all the remaining pilot valves and each command line is configured to communicate with a control line.

7 Claims, 1 Drawing Sheet

(58) Field of Classification Search
CPC ..... Y10T 137/87096; Y10T 137/87265; Y10T 137/87281; Y10T 137/8733
See application file for complete search history.

(56) References Cited

U.S. PATENT DOCUMENTS

| | | | | |
|---|---|---|---|---|
| 1,769,612 | A * | 7/1930 | Wettstein | G05D 13/00 137/12 |
| 5,735,308 | A * | 4/1998 | Yokota | G05D 16/0655 137/488 |
| 5,816,286 | A * | 10/1998 | Scott | G05D 16/163 137/489 |
| 6,595,237 | B2 * | 7/2003 | Cecchinato | G05D 16/163 137/488 |
| 8,091,582 | B2 * | 1/2012 | Folk | F16K 31/1262 137/489 |
| 9,897,258 | B2 * | 2/2018 | Imboccioli | F17D 3/01 |
| 10,663,986 | B2 * | 5/2020 | Imboccioli | G05D 16/0402 |
| 2019/0113179 | A1 * | 4/2019 | Borghesani | F17D 1/04 |

* cited by examiner

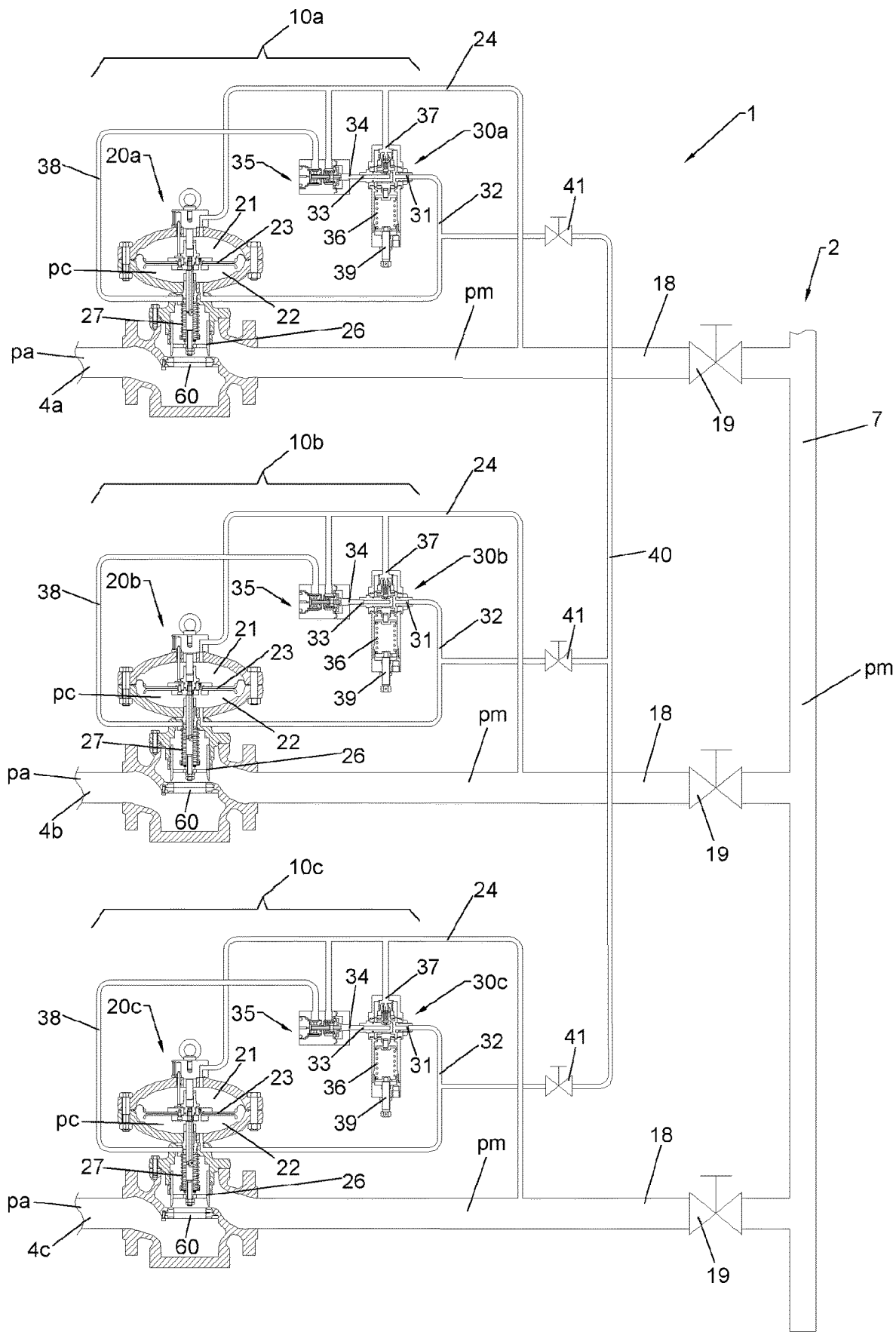

PRESSURE REDUCING PLANT WITH TWO OR MORE LINES OPERATING IN PARALLEL

BACKGROUND OF THE INVENTION

1. The Field of the Invention

The invention concerns a plant for reducing the pressure of fuel gas which, through distribution networks, is sent to utilities.

The invention refers specifically to pressure reduction plants for natural fuel gas, but in general it may refer also to pressure reduction plants for other types of gas.

2. The Relevant Technology

As is known, fuel gas distribution networks receive gas at high pressure, reduce the pressure and send it through a delivery line to the distribution networks which feed individual utilities.

Generally, a gas pressure reduction plant includes two or more supply lines operating in parallel, in each of which the pressure is reduced by pressure reducers which are controlled by pilot valves.

Substantially, the pilot valves control the pressure reducers so that the delivery line pressure remains constant for the whole time of gas delivery and is not affected by any variations in flow rate required by the utilities or by upstream variations in pressure.

For this purpose, calibration members in the pilot valves act on specific calibration springs so that there is a control pressure on the pilot valve outlet, known also as drive pressure, which is sent into the pressure reducer to keep the pressure constant in the delivery line.

Gas distributors use the plants following different strategies.

Some distributors make only one line work and use the other lines as a support or for emergency purposes.

Other distributors on the other hand prefer to have the lines operating in parallel with the same opening, in order to distribute the gas flow rate equally.

Given the low sensitivity of the calibration springs, in practice it is very difficult to control them so that the control pressure leaving all the pilot valves is the same and therefore it is very difficult to guarantee that all pressure reducers work in such a way as to all provide the same flow rate value.

The plant therefore has the natural tendency of one supply line prevailing over the others and delivering the maximum flow rate while the other supply lines deliver flow rates only when the prevailing line is no longer able to deliver all the flow rate required by the utility.

In attempting to divide the total flow rate required by the utility in a balanced manner between the supply lines making up the plant, known electronic control units are used which, according to the measurements made by pressure transducers arranged on the pipes connecting each pilot valve to the corresponding pressure reducer, are able to obtain the same control pressure in all the control chambers of all the pressure reducers.

This makes it possible to obtain approximately the same degree of opening of all the pressure reducers and therefore to obtain a balanced flow rate distribution.

This system may operate only by modifying the pressure downstream, moving away from the mechanical calibration of the pilot and therefore changing the network use conditions.

The limitations of the presented technical solution lie in its complexity, cost and the difficulty in configuring the system.

In particular, electronic control units of the described type require frequent interventions to check their correct operation.

Another known system proposed to obtain an equal distribution between the lines of the flow rate required by the utility is described in the patent document with the international application number WO2012/153310 and relating to a pressure reduction plant of the type including two or more valve assemblies arranged in parallel and each including a pressure reducer connected to a respective pilot valve, in which the problem of guaranteeing the equal distribution between the lines of the flow rate required by the utility is overcome by including a command line arranged in parallel to the valve assemblies with the outlet connected to all the command lines of the pressure reducers.

The aforementioned command line, in particular, includes a regulating valve which in normal conditions controls all the pressure reducers with the same control pressure excluding the other pilot valves, and a safety valve which performs the same functions as the regulating valve and which intervenes in the event of a malfunction of the latter.

This system may also operate only by modifying the pressure downstream, moving away from the mechanical calibration of the pilot and therefore changing the network use conditions.

Substantially, to guarantee the equal distribution between the lines of the flow rate required by the utility, the plant described in the patent document WO2012/153310 uses a command line with an additional regulating valve to the pilot valves making up the valve assemblies in the plant.

The pressure reduction plant described in the patent document WO2015/140706 also applies the same construction concept which provides for the use of additional regulating valves to the pilot valves making up the valve assemblies in the plant.

The solution proposed in the aforesaid patent documents effectively overcomes the problem of guaranteeing the equal distribution between the lines of the flow rate required by the utility but has the drawback of requiring the installation of additional regulating valves to the pilot valves making up each valve assembly in the plant.

This higher number of constituent elements inevitably leads to increased costs of the plant, increased costs for its installation and increased maintenance and control costs.

SUMMARY OF THE INVENTION

The object of the present invention is to create a pressure reduction plant for a fuel gas distribution network which does not have the problems described above.

The present invention therefore sets a first object of creating a pressure reduction plant for a fuel gas distribution network in which, during operation, all the pressure reducers have the same degree of opening so that they all deliver approximately the same flow rate, without the need to provide for any control unit or electronic pressure measuring and/or control assembly.

Another object is that the plant in the invention is constructively less complex and consists of fewer elements compared to equivalent known systems which overcome the same problem of ensuring that during operation all the pressure reducers deliver the same flow rate.

A further object is that in the plant of the invention the regulating valve, which in normal conditions controls all the pressure reducers with the same control pressure, is the pilot valve of any of the valve assemblies making up the plant.

Another object is that the plant of the invention can be created by simply and cheaply modifying any existing plant.

A further object is that the plant of the invention is easier to install, control and maintain compared to equivalent known plants.

Not lastly, another object is to not modify the downstream pressure by switching from "operation of the lines in cascade" to "equal distribution of the flow rate on the lines" and vice versa.

All the listed objects are achieved by a pressure reduction plant for a fuel gas distribution network according to the teachings of the main claim and the dependent claims to which reference is made.

Advantageously, the plant of the invention, compared to other equivalent plants of the prior art, achieves a greater synergy between the elements making up the plant, thus obtaining the same results even though it operates with fewer constituent elements.

Advantageously, the construction and the maintenance of the plant of the invention are thus also less expensive than equivalent known plants which consist of a greater number of elements.

BRIEF DESCRIPTION OF THE DRAWINGS

The objects and advantages listed are better described in the description of a preferred but not exclusive embodiment of the plant of the invention, which is given here-in-below by way of non-limiting example with reference to the attached drawing, in which:

FIG. 1 represents the schematic view of the plant of the invention.

DETAILED DESCRIPTION OF THE PREFERRED EMBODIMENTS

The pressure reduction plant of the invention is represented in FIG. 1 where it is indicated overall by number 1 and is associated to a network 2 which distributes the fuel gas to one or more utilities.

The plant 1 receives the fuel gas from three supply lines indicated respectively with 4a, 4b and 4c which are arranged in parallel to each other and are run through with gas at the same supply pressure pa.

For ease of description, here below the reference number 4 is used to indicate any of the three supply lines 4a, 4b and 4c.

The plant 1 presents a single delivery line indicated by 7 which constitutes a part of the network 2 and in which gas circulates at a delivery pressure pm less than the supply pressure pa.

The plant 1 includes three valve assemblies, each indicated overall by number 10a, 10b and 10c, through which the fuel gas required by the utilities flows and which, as far as possible, is divided equally among the same valve assemblies.

Moreover, each valve assembly 10a, 10b and 10c reduces the supply pressure pa of the inlet gas to the delivery pressure pm of the outlet gas.

The valve assemblies 10a, 10b and 10c are identical and are arranged in parallel, so the description of any of the elements in any valve assembly, for example valve assembly 10a, can be referred to the corresponding element of the other valve assemblies 10b and 10c.

For this reason in the following description the equal components belonging to the valve assemblies 10a, 10b and 10c will be indicated by the same reference number.

The plant 1 of the invention consists of three valve assemblies 10a, 10b and 10c, which we shall call respectively the first, second and third valve assembly, but the following description may also refer to plants including a different number of valve assemblies.

For ease of description, hereafter the reference number 10 will indicate any of the three valve assemblies 10a, 10b and 10c.

Each valve assembly 10a, 10b and 10c includes:
a respective pressure reducer 20a, 20b and 20c, which we shall call respectively the first, second and third pressure reducer;
a respective pilot valve 30a, 30b and 30c, which we shall call respectively the first, second and third pilot valve;
a pressure reducer device 35 connected pneumatically to the respective pressure reducer 20a, 20b and 20c and to the respective pilot valve 30a, 30b and 30c.

Each pressure reducer 20a, 20b and 20c is interposed between a supply line 4 and a delivery line 7 and controls the pressure of the fuel gas which from the supply line 4 to the supply pressure pa flows along the respective outlet lines 18 and delivery lines 7 at the delivery pressure pm.

According to the preferred embodiment described, each pressure reducer is of the normally closed type.

However other embodiments are possible, in which one or more pressure reducers are of the normally open type.

For ease of description, hereafter the reference number 20 is used to indicate any of the three pressure reducers 20a, 20b and 20c.

A manually controlled shut-off valve 19 is interposed between the outlet line 18 and the delivery line 7.

Each pressure reducer includes two chambers 21 and 22, specifically a first chamber 21 and a second chamber 22, separated from each other by an elastic membrane 23.

The first chamber 21 communicates permanently with the outlet line 18 from the pressure reducer 20 via a derivation conduit 24 through which it receives the pneumatic pressure signal defined by the delivery pressure pm present in the outlet lines 18 and delivery lines 7.

As regards on the other hand the second chamber 22, this receives a pneumatic pressure signal, defined as the control pressure or drive pressure and indicated by pc, which is obtained from the same fuel gas coming from the supply line 4, as will be better described below.

Each pressure reducer 20 also includes a shutter 26 connected rigidly in an intermediate position to the membrane 23 which is mobile in response to the delivery pressure pm present in the first chamber 21 and to the control pressure pc present in the second chamber 22 to open and close the gas passage hole 60 from the supply line 4 to the outlet line 18.

It is also possible to note the presence of a spring 27 which exerts an elastic action on the shutter 26 and tends to keep it stably closed in the passage hole 60 preventing the opening action exerted by the control pressure pc acting on the membrane 23.

Each valve assembly 10a, 10b and 10c also includes a respective pilot valve 30a, 30b and 30c, which we call respectively the first, second and third pilot valve. According to the preferred embodiment described, the pilot valves are of the normally open type.

However other embodiments are possible, in which one or more pilot valves are of the normally closed type.

For ease of description, here below the reference number 30 is used to indicate any of the three pilot valves 30a, 30b and 30c.

In each pilot valve 30 it is possible to identify:
- an outlet line 31 which through a command line 32 maintains the control pressure pc in the second chamber 22 of the pressure reducer 20;
- an inlet line 33 which communicates with the outlet line 34 of a pressure reducer device 35 which sends to the pilot valve, generically indicated with reference number 30, a pressure command signal which it receives from the supply line 4 via the derivation line 38;
- an inlet fitting 37 connected to the derivation conduit 24 which introduces into the pilot valve 30 the delivery pressure signal pm taken from the outlet line 18.

The pilot valve 30 also includes an adjustable spring 36 associated to adjustment means 39 to adjust the calibration value pt which corresponds to the thrust that the adjustable spring 36 exerts on the opening of the pilot valve 30.

The thrust exerted by the adjustable spring 36 opposes the fuel gas delivery pressure pm which the derivation conduit 24 takes from the outlet line 18 and introduces into the pilot valve 30 through the inlet fitting 37 and which tends on the other hand to maintain the pilot valve 30 towards the closing position.

There may therefore be three different operating conditions, which are:
- when the delivery pressure pm is greater than the calibration value pt, the pilot valve 30 is closed and in the command line 32 the pressure pc is equal to the pressure pm;
- when the delivery pressure pm is less than the calibration value pt, the pilot valve 30 is completely open and in the command line 32 the control pressure pc is defined by the pressure reducer device 35;
- finally when the delivery pressure pm has the calibration value pt the pilot valve 30 controls the passage of the gas from the inlet line 33 to the outlet line 31 and determines the control pressure pc which is read in the command line 32 and in the second chamber 22 of the pressure reducer 20.

According to the invention any of the pilot valves 30 of any of the valve assemblies 10, for example the pilot valve 30a that equips the first valve assembly 10a, is configured with a calibration value pt' greater than the calibration value pt of all the remaining pilot valves 30b and 30c belonging to the remaining valve assemblies and all the command lines 32 are connected between them by a single control line 40.

Specifically, the plant of the invention includes exclusively two or more valve assemblies 10a, 10b and 10c.

Moreover, each of said valve assemblies 10a, 10b and 10c includes exclusively only one respective pilot valve 30a, 30b and 30c and only one respective pressure reducer device 35.

In particular, each command line 32 communicates with the control line 40 via a shut-off valve 41 which is included in the command line 32.

In this way, appropriately maneuvering the shut-off valves 41 it is possible to isolate each valve assembly from the other valve assemblies making up the plant and define various and different communication conditions between the command lines 32.

The shut-off valves 41 may be indifferently of the manual or automatic operating type and by maneuvering them it is possible to rapidly isolate the command pressures of the individual valve assemblies, making them independent from each other.

In this way the object of being able to rapidly switch the plant configuration from "equal distribution of the flow rate on the lines", particularly suitable for winter use when the flow rates are high, to "operation of the lines in cascade", particularly suitable for summer use when the flow rates are drastically reduced and it is therefore preferable to operate only one line is achieved.

It is important to observe that these operating variations are possible without modifying the delivery pressure pm.

It can be seen that each adjustable spring 36 is associated to adjustment means 39 on which the operator intervenes to adjust the calibration value pt, pt' of the adjustable springs 36.

When in the derivation conduit 24 the delivery pressure pm exceeds the calibration value pt' of the pilot valve 30a, all the pilot valves are closed as the condition occurring is that in which:

$$pm > pt' > pt$$

In normal operating conditions the delivery pressure pm corresponds to the calibration value pt' of the pilot valve 30a which determines the control pressure pc which through the control line 40 is transmitted at the same time to all the command lines 32. In this situation all the second chambers 22 of the pressure reducers 20 are supplied with gas at the same pressure pm and the elastic membranes 23 are all subject to the same force with the result that all the pressure reducers 20, being constructively equal, deliver approximately the same flow rate to all the outlet lines 18 and therefore to the delivery line 7.

During the operation of the plant, any change in the value of the delivery pressure pm will generate a consequent variation in the control pressure pc that is equal for all pilot valves 30 and therefore an equal increase or reduction in the opening of all the pressure reducers 20.

This makes it possible to achieve the main object of the invention outlined in the premises of the present description which consists in the creating of a pressure reduction plant in which all the pressure reducers making up the plant deliver the same flow rate without the use of control unit or electronic pressure measuring and/or control assemblies.

The object of creating a plant that is constructively simpler than equivalent known plants with the same functional characteristics and is therefore also less expensive in terms of construction and maintenance is also achieved.

Indeed, as described, in the plant of the invention the regulating valve, which in normal conditions controls all the pressure reducers with the same control pressure, is the pilot valve of any of the valve assemblies making up the plant.

In this way, compared to the plants described in the aforementioned patent documents, the plant of the present invention is composed of a lower number of lines, valves and connecting elements and is therefore easier and cheaper to assemble and maintain.

It is also achieved the object of not modifying the downstream pressure when the operation of the plant is switched from "operation of the lines in cascade" to "equal distribution of the flow rate on the lines" and vice versa.

When the shut-off valves 41 are closed and therefore if the equal distribution is not required, the lines can work at differentiated calibrations.

If on the other hand equal distribution is required, opening the valves 41 the lines are positioned at approximately the same opening without however modifying the network operating conditions in any way.

The delivery pressure does not change, only the distribution of the flow rate between the individual lines changes.

In the operation stage, variants and/or modifications not described and not represented can be made to the plant of the invention which, should they fall within the context of the following claims, must all be considered to be protected by the present patent.

The invention claimed is:

1. A pressure reduction plant for the distribution of fuel gas to a distribution network, said plant including three or more valve assemblies arranged in parallel with each other and each valve assembly including a pressure reducer, a pilot valve and a pressure reducer device pneumatically connected to the respective pressure reducer and to the respective pilot valve, in which:

each of said pressure reducers is interposed between a supply line and a delivery line to reduce a pressure of said fuel gas from a supply pressure present in said supply lines to a delivery pressure present in said delivery line when said pressure reducer is opened by a control pressure;

each of said pilot valves is configured to be closed by said delivery pressure and to transmit said control pressure to the respective pressure reducer when said delivery pressure reaches a calibration value of said pilot valves, there also being present:

derivation conduits each configured to transmit said delivery pressure from said delivery line to a respective pressure reducer, to a respective pilot valve and to a respective pressure reducer device;

command lines each configured to transmit said control pressure from a respective pilot valve to a respective pressure reducer, wherein said pressure reduction plant includes:

three or more valve assemblies;

a shut-off valve for each command line;

a single control line; and each of said valve assemblies includes:

only one pressure reducer, only one respective pilot valve and only one respective pressure reducer device, all said command lines are connected to each other via said single control line, the single control line being isolated from the supply line of each of the three or more valve assemblies so that during operation of the pressure reduction plant, the fuel gas cannot pass from the supply line associated with one of the three or more valve assemblies, through the single control line and into one of the command lines; and each of said command lines communicates with said control line via said respective shut-off valve, wherein by maneuvering the shut-off valves it is possible to isolate each valve assembly from the other valve assembly, wherein any one of said pilot valves of any one of said valve assemblies can be configured with the calibration value greater than the calibration value of all the remaining pilot valves belonging to the remaining valve assemblies in such a way that said pilot valve with the greater calibration value controls all the pressure reducers with the same control pressure.

2. The pressure reduction plant according to claim 1, wherein each of said pressure reducers includes a first chamber and a second chamber separated from each other by an elastic membrane and each of said pilot valves is fitted with an outlet line, an inlet line and an inlet fitting, said pressure reducers, said pilot valves, said supply lines and said delivery line being pneumatically connected to each other via said derivation conduits and said command lines.

3. The pressure reduction plant according to claim 2, wherein said first chamber of each pressure reducer is connected to said delivery line via a respective one of the derivation conduits and receives a pressure signal defined by said delivery pressure present in said delivery line.

4. The pressure reduction plant according to claim 2, wherein said second chamber of each pressure reducer is connected to said outlet line of the respective pilot valve via a respective one of the command lines from which it receives said pressure signal defined by said control pressure.

5. The pressure reduction plant according to claim 2, wherein said inlet line of each of said pilot valves communicates with said outlet line of said pressure reducer device connected via a respective one of the derivation conduits to a respective supply line.

6. The pressure reduction plant according to claim 2, wherein said inlet fitting of each of said pilot valves communicates with a respective one of said derivation conduits and receives said pressure signal defined by said delivery pressure present in said delivery line.

7. The pressure reduction plant according to claim 1, wherein each of said pilot valves includes an adjustable spring adapted to adjust the calibration value of said spring.

* * * * *